(12) United States Patent
Kitagawa et al.

(10) Patent No.: US 10,112,673 B2
(45) Date of Patent: Oct. 30, 2018

(54) SENSOR SUPPORT STRUCTURE AND MOTORCYCLE

(71) Applicant: SUZUKI MOTOR CORPORATION, Hamamatsu-shi, Shizuoka (JP)

(72) Inventors: Yuji Kitagawa, Hamamatsu (JP); Takayo Yamamoto, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 122 days.

(21) Appl. No.: 15/250,286

(22) Filed: Aug. 29, 2016

(65) Prior Publication Data

US 2017/0057578 A1    Mar. 2, 2017

(30) Foreign Application Priority Data

Aug. 31, 2015 (JP) .................................. 2015-170291

(51) Int. Cl.
  *B62K 11/02* (2006.01)
  *B62J 1/08* (2006.01)
  *B62J 99/00* (2009.01)

(52) U.S. Cl.
  CPC ................ *B62K 11/02* (2013.01); *B62J 1/08* (2013.01); *B62J 2099/002* (2013.01)

(58) Field of Classification Search
  CPC ............... B62J 2099/002; B62K 11/02–11/08
  See application file for complete search history.

(56) References Cited

U.S. PATENT DOCUMENTS

| | | | |
|---|---|---|---|
| 8,002,066 B2* | 8/2011 | Harada | B60T 8/3685 180/219 |
| 9,010,475 B2* | 4/2015 | Nagai | B60T 8/3225 180/219 |
| 9,802,589 B2* | 10/2017 | Kitagawa | G01D 11/30 |
| 2006/0151226 A1* | 7/2006 | Misaki | B62K 25/283 180/227 |
| 2007/0145227 A1* | 6/2007 | Hasegawa | B60T 8/3685 248/637 |
| 2011/0031054 A1* | 2/2011 | Matayoshi | B60T 8/3685 180/227 |
| 2017/0057578 A1* | 3/2017 | Kitagawa | B62J 1/08 |

FOREIGN PATENT DOCUMENTS

| | | | | |
|---|---|---|---|---|
| EP | 2 130 731 A2 | 5/2009 | | |
| JP | 2009-292350 A | 12/2009 | | |
| JP | 2014201173 A | * 10/2014 | | |
| WO | WO-2015142297 A1 | * 9/2015 | ............. | B62K 11/10 |

* cited by examiner

*Primary Examiner* — Kevin Hurley
(74) *Attorney, Agent, or Firm* — Stein IP, LLC (57) ABSTRACT

There is provided a sensor support structure. A bracket is fixed to a vehicle body frame comprised of a plurality of frame members. A sensor is attached to a first attachment surface of the bracket. A component is attached to a second attachment surface of the bracket. The sensor is disposed in a space surrounded by the plurality of frame members of the vehicle body frame.

7 Claims, 7 Drawing Sheets

SENSOR SUPPORT STRUCTURE AND MOTORCYCLE

CROSS-REFERENCE TO RELATED APPLICATIONS

The disclosure of Japanese Patent Application No. 2015-170291 filed on Aug. 31, 2015, including specification, drawings and claims is incorporated herein by reference in its entirety.

TECHNICAL FIELD

The disclosure relates to a sensor support structure for supporting a sensor configured to detect a behavior of a vehicle and a motorcycle having the same.

BACKGROUND

In general, a motorcycle is mounted with an ABS (Antilock Brake System) unit so as to prevent wheels from being locked upon sudden braking. The ABS unit is input with detection signals from a sensor configured to detect a wheel speed and a sensor configured to detect acceleration and the like, and is configured to control brake pressures on front and rear wheels on the basis of the detection signals (for example, refer to Patent Document 1). Since not only the sensor used for the ABS control but also the sensor used to detect a behavior of the vehicle has strict vibration conditions, the sensor is attached to a place of the vehicle to which high-frequency vibrations such as engine vibrations are difficult to be transmitted.

Patent Document 1: Japanese Patent Application Publication No. 2009-292350A

However, an arrangement layout is limited so as to satisfy the vibration conditions of the sensor because the sensor is attached to the place to which the high-frequency vibrations are difficult to be transmitted. For this reason, the sensor may be attached to a place to which an external shock is to be applied upon turnover or collision of the vehicle. Also, when the sensor is attached to the vehicle via a member such as a bracket, the attaching operation is troublesome, maintainability is lowered, and the number of components increases by the bracket, thereby increasing a mounting space.

SUMMARY

It is therefore an object of the disclosure to provide a sensor support structure and a motorcycle capable of reducing an influence of an external shock, saving a mounting space of a bracket and improving maintainability.

According to an aspect of the embodiments of the present invention, there is provided a sensor support structure, comprising: a bracket fixed to a vehicle body frame comprised of a plurality of frame members; a sensor attached to a first attachment surface of the bracket; and a component attached to a second attachment surface of the bracket, wherein the sensor is disposed in a space surrounded by the plurality of frame members of the vehicle body frame.

According to the above configuration, the bracket is attached with the component, in addition to the sensor, so that an overall weight to be supported by the bracket increases by the attached component and the bracket is thus difficult to vibrate. Since vibrations from the vehicle body frame are difficult to be transmitted to the sensor, even when the sensor is arranged in the space surrounded by the plurality of frame members, it is possible to satisfy vibration conditions of the sensor. Therefore, it is possible to protect the sensor from an external shock by the frame members. Also, the bracket is used for both the sensor and the component, so that the respective brackets are not required. Thereby, the maintainability can be improved and the space can be saved. Further, it is possible to reduce the number of components, thereby reducing weight and cost.

In the sensor support structure, the plurality of frame members may include a main frame configured to support an engine, a pair of right and left upper seat rails configured to support a seat at the rear of the main frame, and a pair of right and left lower seat rails configured to support the pair of right and left upper seat rails from below, and the sensor may be disposed in a space surrounded by the pair of right and left upper seat rails and the pair of right and left lower seat rails. According to this configuration, it is possible to protect the sensor by the pair of right and left upper seat rails and the pair of right and left lower seat rails. Also, the sensor is accommodated between the pair of right and left upper seat rails and the pair of right and left lower seat rails, so that an outward appearance design is not deteriorated.

In the sensor support structure, the first attachment surface may be inclined or orthogonal relative to the second attachment surface. According to this configuration, since the component and the sensor are arranged side by side in the right and left direction, when connecting harness to each of the component and the sensor, an operator can perform the operation in the same posture. Therefore, it is possible to improve the operability of the operation of connecting the harness. Also, the component and the sensor are arranged with being overlapped in a height direction for saving a space, so that it is possible to arrange the component and the sensor in a space, which is narrow in the height direction.

In the sensor support structure, an outer surface of the bracket obtained by bending one end-side of the bracket in a right and left direction of a vehicle body may be the first attachment surface, and the sensor may be disposed between the frame member and the component. According to this configuration, the sensor is disposed at a position avoiding the upper of the wheel. Therefore, it is possible to protect the sensor from a lateral shock by the frame members and to protect the sensor from foreign matters and water droplets captured to the wheel.

In the sensor support structure, the bracket may be provided next to an attachment position of a rear cushion unit to the vehicle body frame. According to this configuration, the bracket is provided next to the rear cushion unit of high strength and high rigidity, so that protection performance of the sensor and the component is improved. Also, since the bracket, which is a heavy member, is provided next to the attachment position of the rear cushion unit, it is possible to reduce an influence of bending moment on the frame members.

In the sensor support structure, the bracket may be positioned just below a seat. According to this configuration, since the bracket, which is a heavy member, is arranged with being concentrated on a vehicle body center, it is possible to reduce inertia moment upon turning of the vehicle body, thereby improving the operability.

The sensor support structure may further comprise: a vibration absorbing material interposed between the bracket and the vehicle body frame; and another vibration absorbing material interposed between the sensor and the first attachment surface. According to this configuration, the bracket is floating-supported to the vehicle body frame by the vibration absorbing material, and the sensor is floating-supported to the bracket by another vibration absorbing material. Therefore, since the sensor is doubly floating-supported to the vehicle body frame, it is possible to more effectively suppress the vibration propagation from the vehicle body frame to the sensor.

According to another aspect of the embodiments of the present invention, there is provided a motorcycle comprising the above sensor support structure. According to this configuration, countermeasures against the vibrations can be effectively implemented for the sensor and the component of the motorcycle, and the sensor and the component can be protected from the external shock applied to the motorcycle.

According to the sensor support structure of the disclosure, the sensor and the component are attached to the bracket and the sensor is disposed in the space surrounded by the plurality of frame members, so that the countermeasures against the vibrations can be effectively implemented for the sensor and the component and the sensor and the component can be protected from the external shock applied to the motorcycle.

DETAILED DESCRIPTION OF THE EMBODIMENTS

Figure 1:
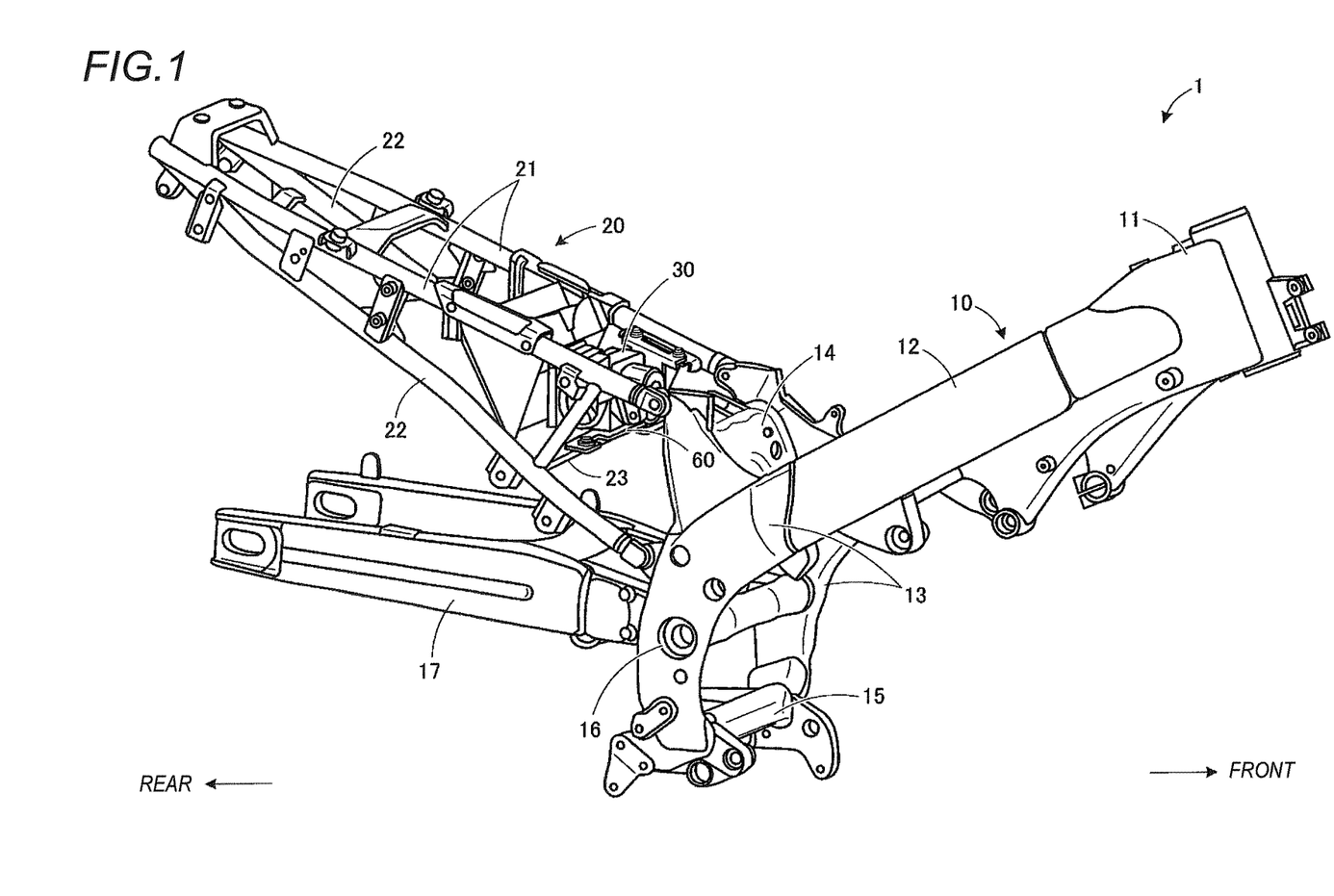
FIG. 1 is a perspective view of a vehicle body frame in accordance with an illustrative embodiment.
Figure 2:
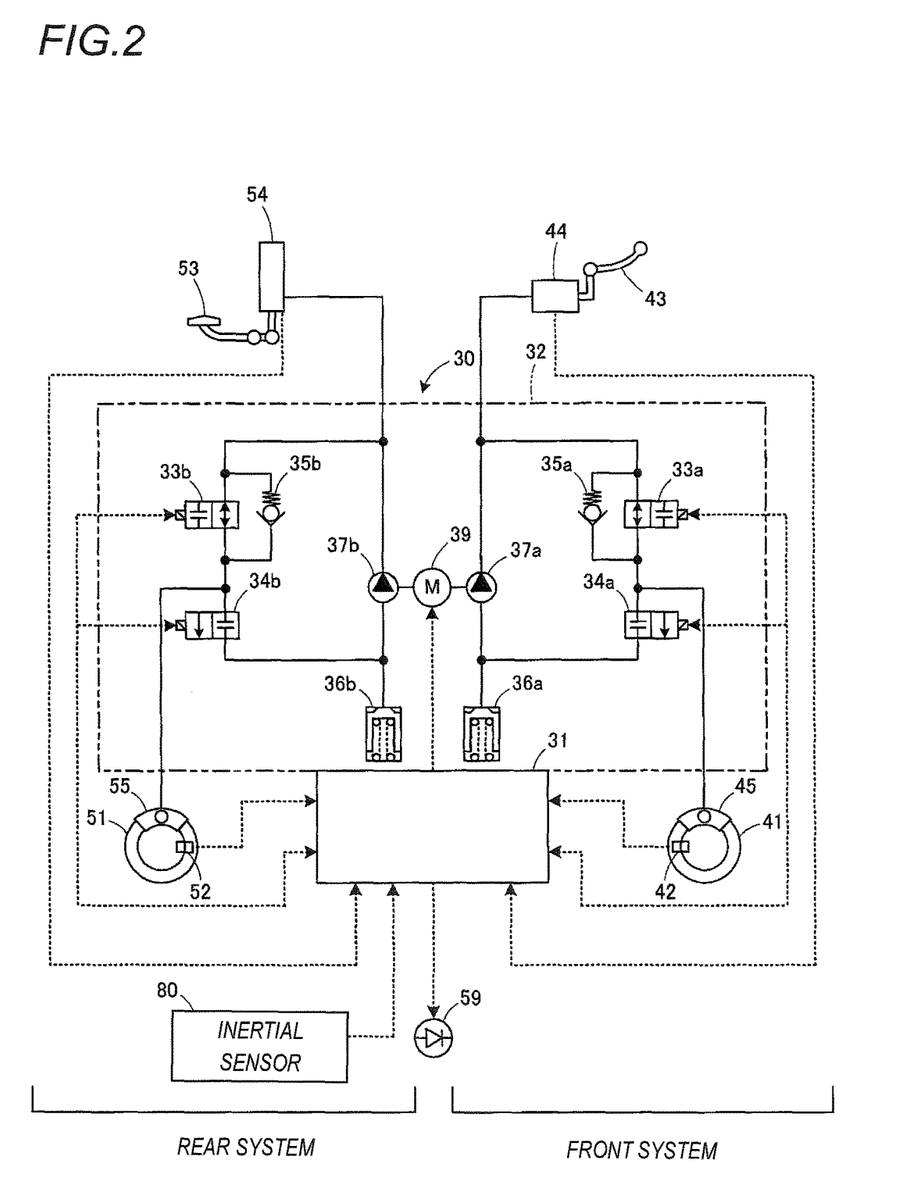
FIG. 2 is a system image diagram of an ABS in accordance with the illustrative embodiment.

Hereinafter, an illustrative embodiment will be described in detail with reference to the accompanying drawings. Meanwhile, in the below, an example where a sensor support structure of the disclosure is applied to a motorcycle will be described. However, the disclosure is not limited to a saddle-type vehicle such as a motorcycle and can also be applied to other saddle-type vehicles such as a three-wheeled vehicle or a four-wheeled vehicle. FIG. 1 is a perspective view of a vehicle body frame in accordance with an illustrative embodiment. FIG. 2 is a system image diagram of an ABS in accordance with the illustrative embodiment.

As shown in FIG. 1, a vehicle body frame 1 has a configuration where a seat rail 20 is attached to a main frame 10 configured to mount thereto respective units such as an electric system and made of steel or aluminum alloy. The main frame 10 has a pair of tank rails 12 extending rearward with being branched in a right and left direction from a head frame 11 positioned at a front end and a pair of body frames 13 extending downward from rear ends of the respective tank rails 12. The head frame 11, the tank rails 12 and the body frames 13 form an accommodation space for an engine (not shown) and the like, and the engine is suspended thereto, so that the vehicle body frame 1 is reinforced.

The pair of body frames 13 is coupled at upper sides by an upper bridge 14 and is coupled at lower sides by a lower bridge 15. Also, the pair of body frames 13 is respectively formed with swing arm pivots 16, and swing arms 17 configured to support a rear wheel (not shown) are coupled to the swing arm pivots 16 so that they can be vertically swingable. A rear cushion unit 19 (refer to FIG. 5) for rear wheel suspension is coupled to the upper bridge 14, and a lower part of the rear cushion unit 19 is coupled to the lower bridge 15 and the swing arms 17 via a link mechanism.

The seat rail 20 extending in a rear-upper direction is connected to the upper sides of the pair of body frames 13. The seat rail 20 includes a pair of right and left upper seat rails 21 configured to support a seat 29 (refer to FIG. 5) at the rear of the main frame 10 and a pair of right and left lower seat rails 22 configured to support the upper seat rails 21 from below. A space surrounded by the upper seat rails 21 and the lower seat rails 22 is an accommodation space of an ABS unit 30. The pair of right and left lower seat rails 22 is coupled by a rail bridge 23. The ABS unit 30 is attached to a surface (upper surface) of a bracket 60, which is a plate-shaped member bridged to the rail bridge 23 and the left upper seat rail 21.

As shown in FIG. 2, the ABS unit 30 is configured to detect wheel speeds by wheel speed sensors 42, 52 attached to a front wheel 41 and a rear wheel 51 and to automatically control a brake, thereby preventing lock of the wheels. The ABS unit 30 is integrally formed with a control unit 31 and a hydraulic unit (HU) 32. A hydraulic circuit of the hydraulic unit 32 is divided into a front system and a rear system, and is configured as separate systems at the front and rear wheels 41, 51. The respective systems include inlet solenoid valves 33a, 33b, outlet solenoid valves 34a, 34b, one-way valves 35a, 35b, reservoirs 36a, 36b and pumps 37a, 37b.

In the front system, a hydraulic pressure from a master cylinder 44 of a front brake lever 43 is applied to a front brake caliper 45 through the inlet solenoid valve 33a. Also, when rapid reduction in rotation of the front wheel 41 is detected, the hydraulic pressure from the master cylinder 44 is blocked by the inlet solenoid valve 33a and the outlet solenoid valve 34a is opened to pull brake oil from the front brake caliper 45 to the reservoir 36a, so that the hydraulic pressure is reduced. The hydraulic pressure temporarily retained in the reservoir 36a is sucked and returned to the master cylinder 44-side by the pump 37a. Also in the rear system, the hydraulic pressure from the master cylinder 54 of a rear brake pedal 53 is controlled, like the front system.

The control unit 31 is configured by an input-side interface, an output-side interface, a processor, a memory and the like. The memory is configured by one or more storage media such as a ROM (Read Only Memory), a RAM (Random Access Memory) and the like, depending on utilities. In the memory, a variety of programs and parameters for ABS control are stored. To the input-side interface, a brake light switch, the wheel speed sensors 42, 52, an inertial sensor (sensor) 80 and the like are connected. To the output-side interface, the solenoid valves 33a, 33b, 34a, 34b, an indicator lamp 59, a motor 39 and the like are connected.

The ABS unit 30 is configured to control the solenoid valves 33a, 33b, 34a, 34b and the motor 39, based on the wheel speeds of the front and rear wheels 41, 51 detected by the wheel speed sensors 42, 52 and acceleration, angular velocity and the like detected by the inertial sensor 80. That is, when the wheel speeds of the front and rear wheels 41, 51 are reduced with respect to a speed of the vehicle body, the ABS unit 30 keeps and reduces the brake pressure, thereby preventing lock of the wheels. On the other hand, when the wheel speeds of the front and rear wheels 41, 51 come close to the speed of the vehicle body, the ABS unit increases the brake pressure. These controls are repeated, so that it is possible to appropriately reduce the speed without locking the front and rear wheels 41, 51 on a slippery road surface and the like.

In the meantime, since the inertial sensor 80 used for the ABS unit 30 is susceptible to a shock, the inertial sensor is preferably attached to a position at which it is protected from the external shock, for example an inner side of the vehicle body frame 1. However, since the inertial sensor 80 has strict vibration conditions, it is usually attached to a position to which vibrations from the vehicle body frame 1 are difficult to be propagated. Therefore, although the inertial sensor 80 is preferably arranged in the vicinity of the vehicle body frame 1 from a standpoint of protection, it is not possible to satisfy the vibration conditions in the vicinity of the vehicle body frame 1. Further, it is necessary to prepare a bracket so as to attach the inertial sensor 80 to the vehicle body frame 1.

Therefore, in the illustrative embodiment, the inertial sensor 80 is attached to the bracket 60 used for the ABS unit 30, so that a weight to be supported by the bracket 60 is thus increased to lower an inherent frequency and to make it difficult for the bracket 60 to vibrate. Thereby, countermeasures against the vibrations can be implemented for the ABS unit 30, and it is possible to satisfy the vibration conditions of the inertial sensor 80 in the vicinity of the vehicle body frame 1. Also, the bracket is used for both the ABS unit 30 and the inertial sensor 80, so that it is not necessary to attach the respective brackets, thereby improving maintainability and saving the space. Further, it is possible to reduce the number of components and to save weight and cost.

Figure 3:
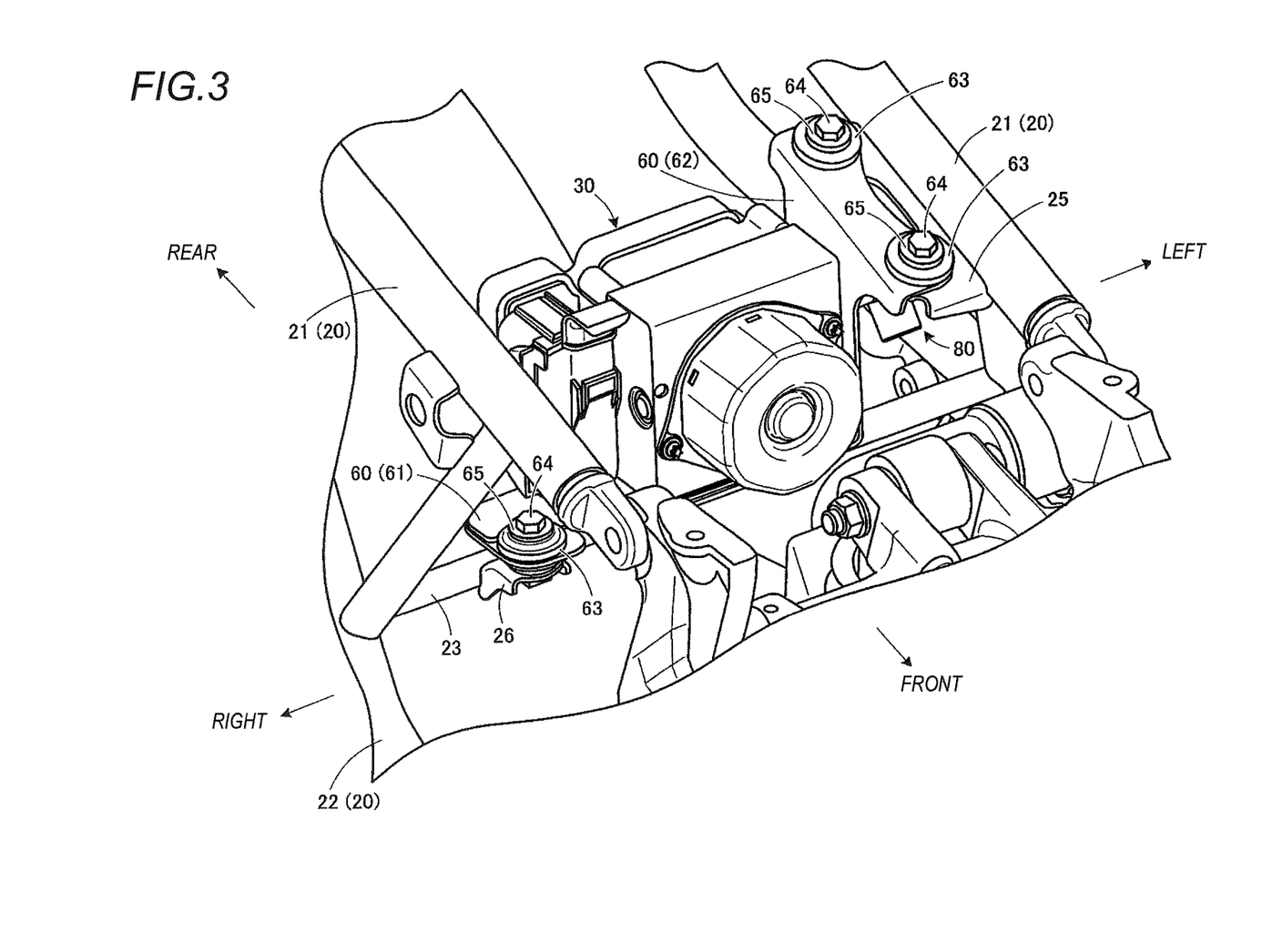
FIG. 3 is a perspective view of an attachment structure of an inertial sensor in accordance with the illustrative embodiment, as seen from front.
Figure 4:
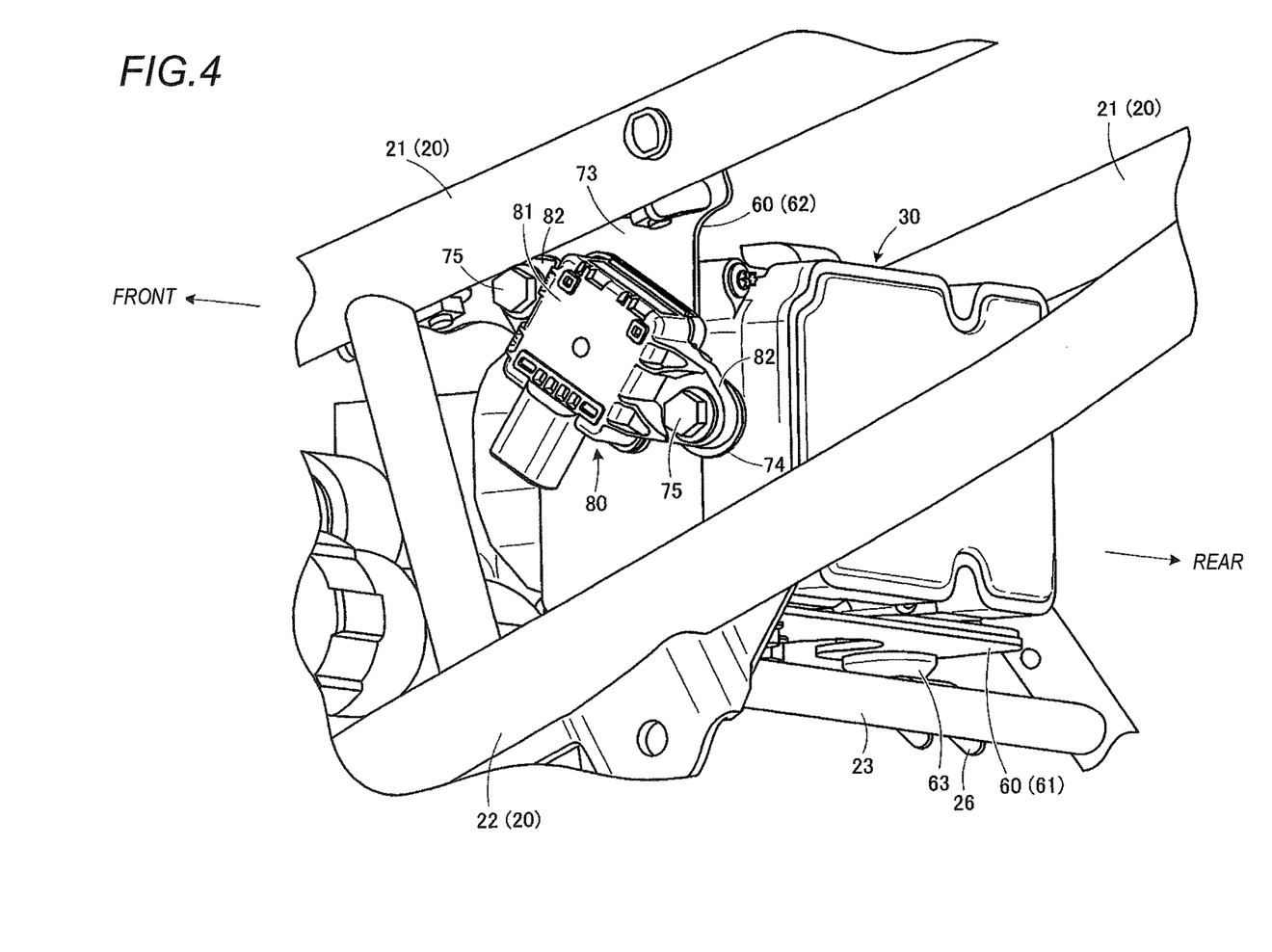
FIG. 4 is a perspective view of the attachment structure of the inertial sensor in accordance with the illustrative embodiment, as seen from rear.

In the below, the ABS unit and the inertial sensor support structure are described with reference to FIGS. 3 and 4. FIG. 3 is a perspective of an attachment structure of the inertial sensor in accordance with the illustrative embodiment, as seen from front. FIG. 4 is a perspective view of the attachment structure of the inertial sensor in accordance with the illustrative embodiment, as seen from rear.

As shown in FIGS. 3 and 4, frame brackets 25, 26 configured to support the bracket 60 are respectively attached to the left upper seat rail 21 and the rail bridge 23. The bracket 60 is fixed to each of the frame brackets 25, 26 via a plurality of rubber bushes 63 by a plurality of bolts 64. The bracket 60 is a plate-shaped member bent into a substantial L shape, as seen from a section, and has a horizontal plate part 61 extending in the right and left direction and a vertical plate part 62 extending upward from a left end of the horizontal plate part 61. The bracket 60 is attached to the frame bracket 26 of the rail bridge 23 at a right end-side of the horizontal plate part 61 and is attached to the frame bracket 25 of the upper seat rail 21 at an upper end-side of the vertical plate part 62.

In this case, the horizontal plate part 61 is formed with an attachment hole (not shown) to the frame bracket 26, and the vertical plate part 62 is formed with an attachment hole (not shown) to the frame bracket 25. In the attachment holes of the horizontal plate part 61 and the vertical plate part 62, the cylindrical rubber bushes 63 serving as a vibration absorbing material are respectively mounted with protruding in the upper-lower direction from upper and lower surfaces of the horizontal plate part 61 and the vertical plate part 62. A cylindrical collar 65 is mounted on an inner peripheral surface of each rubber bush 63, and a male screw of the bolt 64 is inserted into the collar 65 and is fixed to a female screw of each of the frame brackets 25, 26.

Figure 6:
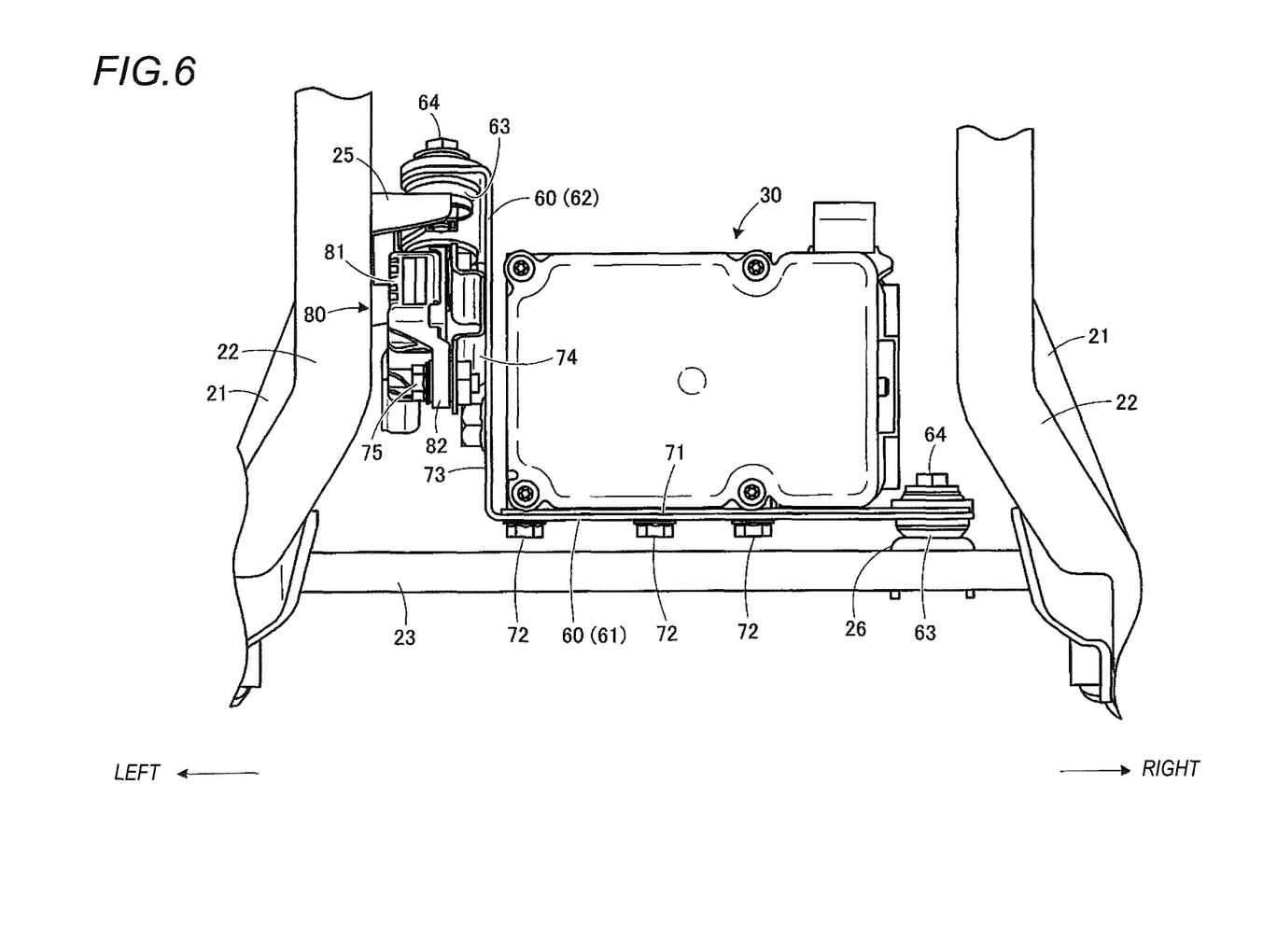
FIG. 6 is a rear view of the attachment place of the inertial sensor in accordance with the illustrative embodiment.

Since the rubber bushes 63 protrude downward beyond the lower surfaces of the horizontal plate part 61 and the vertical plate part 62, gaps are formed between the bracket 60 and the frame brackets 25, 26 (refer to FIG. 6). Also, since the rubber bushes 63 protrude upward beyond the upper surfaces of the horizontal plate part 61 and the vertical plate part 62, head parts of the bolts 64 are not directly contacted to the horizontal plate part 61 and the vertical plate part 62. In this way, the bracket 60 is floating-supported to the left upper seat rail 21 and the rail bridge 23 in a double supporting manner by the horizontal plate part 61 and the vertical plate part 62. By the rubber bushes 63, the vibrations to be transmitted from the upper seat rails 21 and the lower seat rails 22 to the bracket 60 are absorbed.

An upper surface 71 (refer to FIG. 6) of the horizontal plate part 61 of the bracket 60 is configured as a second attachment surface to which the ABS unit 30 is to be attached, and the ABS unit 30 is attached to the upper surface 71 of the horizontal plate part 61 by a plurality of bolts 72 (refer to FIG. 6) inserted from the lower surface-side. An outer surface 73 of the vertical plate part 62 of the bracket 60 is configured as a first attachment surface to which the inertial sensor 80 is to be attached, and the inertial sensor 80 is attached to an attachment plate 74 (refer to FIG. 6) fixed to the outer surface 73 by a pair of bolts 75. The attachment plate 74 is a rectangular plate-shaped member fixed to the outer surface 73 at a central part, and is configured to support the inertial sensor 80 in the double supporting manner at both end parts bent to be spaced from the outer surface 73.

The inertial sensor 80 is used for ABS control, has a pair of arm parts 82 extending from a sensor main body 81, and is attached to both end parts of the attachment plate 74 by the pair of arm parts 82. By using the attachment plate 74, the inertial sensor 80 is fixed to the bracket 60 with the entire inertial sensor 80 floating from the outer surface 73 of the bracket 60. In this way, the rubber bushes 63 are interposed between the frame brackets 25, 26 and the bracket 60, and the attachment plate 74 is interposed between the bracket 60 and the inertial sensor 80. Therefore, the inertial sensor 80 is doubly floating-supported to the seat rail 20 by the rubber bushes 63 and the attachment plate 74.

In this way, the bracket 60 is attached with the inertial sensor 80, in addition to the ABS unit 30. Since both the ABS unit 30 and the inertial sensor 80 are fixed to the seat rail 20 via the rubber bushes 63, it is possible to absorb the vibrations from the seat rail 20 by the rubber bushes 63. In addition to this, the ABS unit 30 and the inertial sensor 80 are attached to the bracket 60, so that a weight increases. Thereby, the bracket 60 is difficult to vibrate, so that it is possible to effectively suppress the vibrations to be propagated from the seat rail 20 to the ABS unit 30 and the inertial sensor 80. Therefore, it is possible to support the inertial sensor 80 by the seat rail 20 to which the vibrations are likely to be transmitted.

Figure 5:
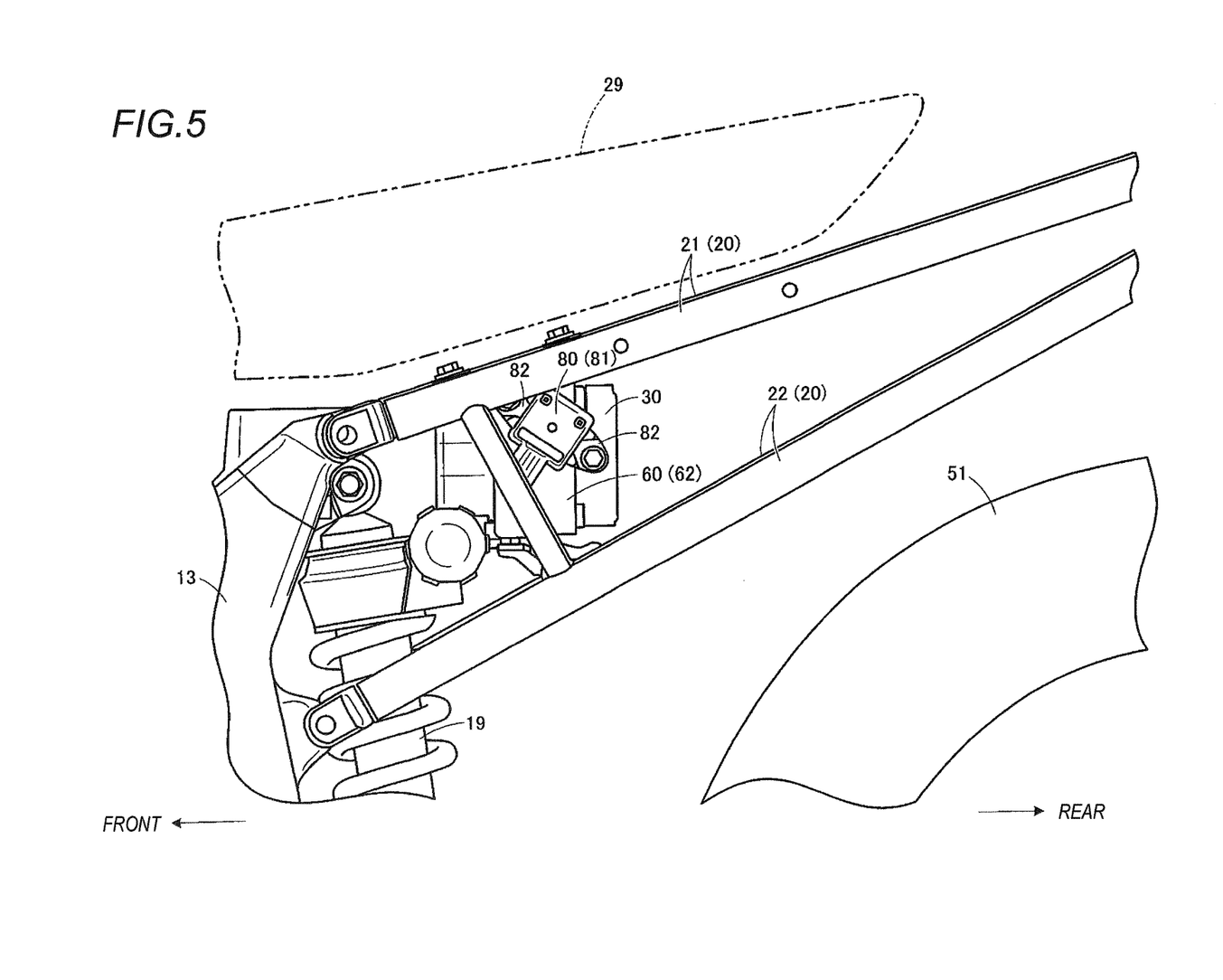
FIG. 5 is a left view of an attachment place of the inertial sensor in accordance with the illustrative embodiment.
Figure 7:
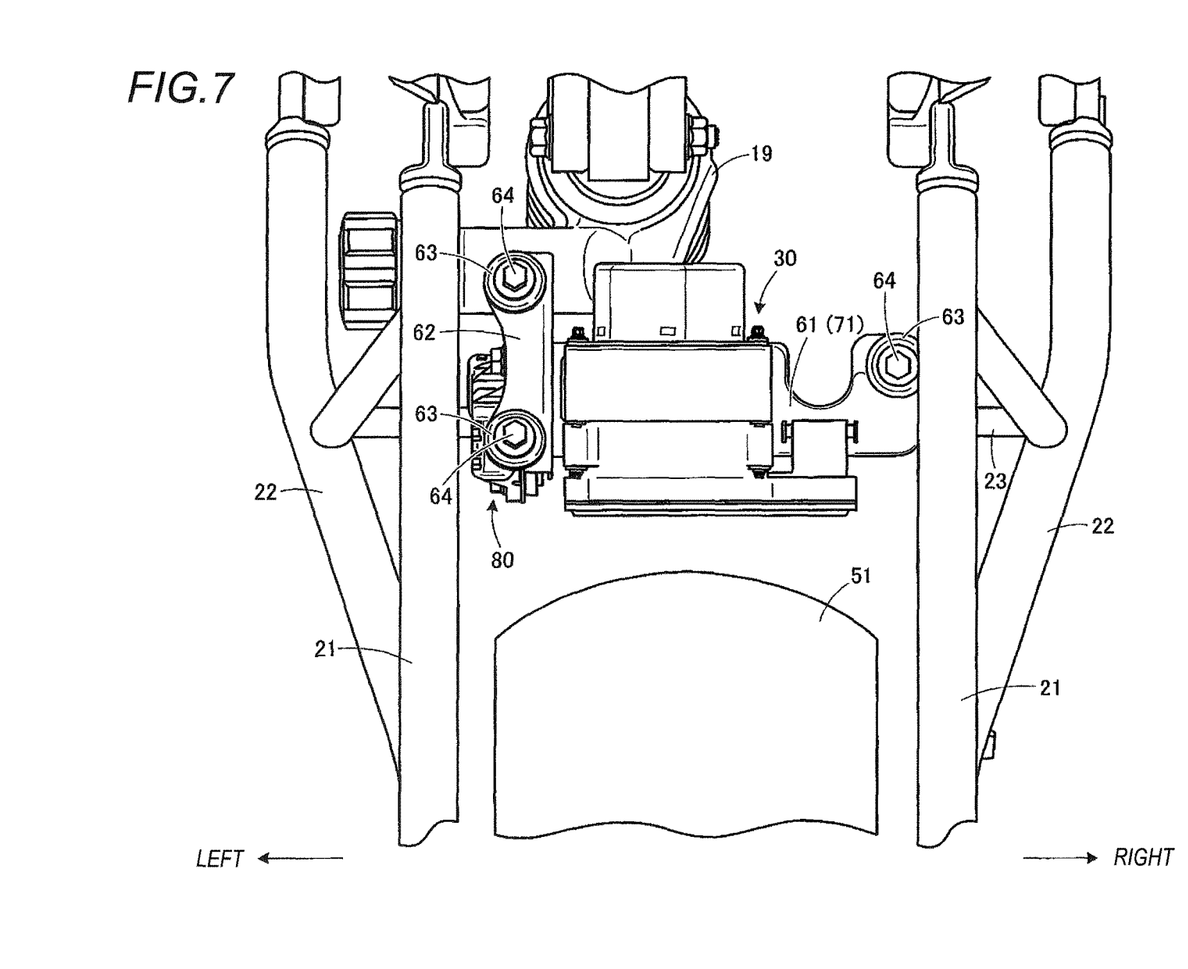
FIG. 7 is a plan view of the attachment place of the inertial sensor in accordance with the illustrative embodiment.

Subsequently, arrangement places of the ABS unit and the inertial sensor are described in detail. FIG. 5 is a left view of an attachment place of the inertial sensor in accordance with the illustrative embodiment. FIG. 6 is a rear view of the attachment place of the inertial sensor in accordance with the illustrative embodiment. FIG. 7 is a plan view of the attachment place of the inertial sensor in accordance with the illustrative embodiment. Meanwhile, in FIG. 7, the frame brackets are omitted for convenience of explanations.

As shown in FIG. 5, the ABS unit 30 and the inertial sensor 80 attached to the bracket 60 are disposed in the space surrounded by the pair of right and left upper seat rails 21 and the pair of right and left lower seat rails 22. Therefore, the ABS unit 30 and the inertial sensor 80 are protected from the external shock by the pair of right and left upper seat rails 21 and the pair of right and left lower seat rails 22. In this case, the ABS unit 30 and the inertial sensor 80 are disposed to be accommodated between the upper seat rails 21 and the lower seat rails 22, as seen from a side view. Therefore, the ABS unit 30 and the inertial sensor 80 are accommodated in a side cowl (not shown), so that an outward appearance design is not deteriorated.

The bracket 60 is provided next to the attachment position of the rear cushion unit 19 to the body frame 13. That is, the bracket 60 is mounted in the vicinity of front end portions of the upper seat rails 21 and the lower seat rails 22 to be coupled to the body frame 13. The attachment position of the rear cushion unit 19 to the body frame 13 is high strength and high rigidity, so that the front end-sides of the upper seat rails 21 and the lower seat rails 22 are reinforced by the body frame 13. Therefore, the bracket 60 is provided next to the attachment position of the rear cushion unit 19, so that the protection performance of the ABS unit 30 and the inertial sensor 80 is improved.

Also, the bracket 60 is attached with the ABS unit 30 and the inertial sensor 80, so that it becomes a heavy member. The bracket 60, which is a heavy member, is provided next to the rear cushion unit 19, i.e., at the front end-sides of the upper seat rails 21 and the lower seat rails 22. The front end-sides of the upper seat rails 21 and the lower seat rails 22 are reinforced by the body frame 13, as described above. Therefore, as compared to a configuration where the bracket 60, which is a heavy member, is provided at a position spaced from the rear cushion unit 19, an influence of bending moment on the upper seat rails 21 and the lower seat rails 22 is reduced.

Further, the bracket 60 is positioned just below the seat 29. By this configuration, the bracket 60, which is a heavy member, is arranged with being concentrated on a vehicle body center, so that it is possible to reduce inertia moment upon turning of the vehicle body, thereby improving the operability. In this way, the bracket 60 is attached to the upper seat rails 21 and the lower seat rails 22, so that it is possible to secure a space for attaching other components below the ABS unit 30, thereby improving a layout property. Also, since the ABS unit 30 and the inertial sensor 80 are made as a unit by the bracket 60, it is possible to improve the operability, as compared to a configuration where the ABS unit and the inertial sensor are individually attached.

As shown in FIG. 6, the ABS unit 30 is fixed to contact the upper surface 71 of the horizontal plate part 61 of the bracket 60, and the inertial sensor 80 is fixed from being spaced from the outer surface 73 of the vertical plate part 62 of the bracket 60 via the attachment plate 74. As described above, since the rubber bushes 63 are interposed between the bracket 60 and the frame brackets 25, 26, the vibrations propagated from the upper seat rails 21 and the lower seat rails 22 are difficult to be transmitted to the ABS unit 30 and the inertial sensor 80. Since the inertial sensor 80 is spaced from the bracket 60 with the attachment plate 74 being interposed therebetween, the vibrations are more difficult to be transmitted.

Also, since the ABS unit 30 itself generates the vibrations upon the driving, the inertial sensor 80 is spaced from the outer surface 73 of the bracket 60, so that it is possible to suppress the vibrations to be propagated from the ABS unit 30 to the inertial sensor 80. The vibrations of the ABS unit 30 and the inertial sensor 80 are suppressed, so that it is possible to arrange the ABS unit 30 and the inertial sensor 80 at the positions for which the strict vibration conditions are required, for example, the inner sides of the upper seat rails 21 and the lower seat rails 22.

Also, the bracket 60 is bent so that the vertical plate part 62, to which the inertial sensor 80 is to be attached, is orthogonal to the horizontal plate part 61, to which the ABS unit 30 is to be attached. Therefore, the inertial sensor 80 is disposed at the side of the ABS unit 30. Since the ABS unit 30 and the inertial sensor 80 are arranged side by side in the right and left direction, when connecting each harness branched from main harness to the ABS unit 30 and the inertial sensor 80, respectively, an operator can perform the operation in the same posture. Therefore, it is possible to improve the operability of the operation of connecting the harness. Also, the ABS unit 30 and the inertial sensor 80 are arranged with being overlapped in a height direction for saving a space, so that it is possible to arrange the ABS unit 30 and the inertial sensor 80 between the upper seat rails 21 and the lower seat rails 22.

As shown in FIG. 7, the inertial sensor 80 is arranged between the left seat rails 21, 22 and the ABS unit 30. That is, the inertial sensor 80 is disposed at a position avoiding the upper of the rear wheel 51. Therefore, it is possible to protect the inertial sensor 80 from a lateral shock by the left seat rails 21, 22 and to protect the inertial sensor 80 from foreign matters and water droplets captured to the rear wheel 51. Also, since the ABS unit 30 is disposed on the upper surface 71 of the horizontal plate part 61, it is possible to protect the ABS unit 30 from the foreign matters and water droplets captured to the rear wheel 51 by the horizontal plate part 61.

As described above, according to the illustrative embodiment, the bracket 60 is attached with the ABS unit 30, in addition to the inertial sensor 80, so that an overall weight to be supported by the bracket 60 increases by the ABS unit and the bracket 60 is thus difficult to vibrate. Since the vibrations from the vehicle body frame 1 are difficult to be transmitted to the inertial sensor 80, even when the inertial sensor 80 is arranged in the space surrounded by the upper seat rails 21 and the lower seat rails 22, it is possible to satisfy the vibration conditions of the inertial sensor 80. Therefore, the inertial sensor 80 is protected from the external shock by the upper seat rails 21 and the lower seat rails 22. Also, the bracket 60 is used for both the inertial sensor 80 and the ABS unit 30, so that the respective brackets are not required. Thereby, the maintainability can be improved and the space can be saved. Further, it is possible to reduce the number of components, thereby reducing the weight and the cost.

In the meantime, the disclosure is not limited to the illustrative embodiment and can be diversely changed and implemented. In the illustrative embodiment, the sizes, shapes and the like shown in the accompanying drawings are not limited thereto and can be appropriately changed within a scope of achieving the effects of the disclosure. In addition, the illustrative embodiment can be appropriately changed without departing from the object of the disclosure.

For example, in the illustrative embodiment, the inertial sensor 80 is attached to the outer surface 73 of the vertical plate part 62, which is the first attachment surface of the bracket 60, and the ABS unit 30 is attached to the upper surface 71 of the horizontal plate part 61, which is the second attachment surface of the bracket 60. However, the disclosure is not limited thereto. For example, the inertial sensor 80 may be attached to the upper surface 71 of the horizontal plate part 61, which is the first attachment surface, and the ABS unit 30 may be attached to the outer surface 73 of the vertical plate part 62, which is the second attachment surface.

Also, in the illustrative embodiment, the inertial sensor 80 is attached to the outer surface 73 of one end-side in the right and left direction of the bracket 60, which is the first attachment surface. However, the disclosure is not limited thereto. For example, the inertial sensor 80 may be attached to the outer surface 73 of one bent end-side in the front-rear direction of the bracket 60, which is the first attachment surface.

Also, in the illustrative embodiment, the bracket 60 is configured by the plate-shaped member having a substantial L shape, as seen from a section. However, the disclosure is not limited thereto. For example, the bracket 60 may be configured to have the first and second attachment surfaces to which the inertial sensor 80 and the ABS unit 30 are to be attached. For instance, a backside of a flat plate may be configured as the first attachment surface to which the inertial sensor 80 is to be attached, and an upper surface of the flat plate may be configured as the second attachment surface to which the ABS unit 30 is to be attached.

Also, in the illustrative embodiment, the bracket 60 is fixed to the upper seat rail 21 and the rail bridge 23. However, the disclosure is not limited to this configuration. The bracket 60 may be fixed to the plurality of frame members of the vehicle body frame 1. For example, the bracket 60 may be fixed to the main frame 10 or the lower seat rail 22. Therefore, the disclosure is not limited to the configuration where the sensor is disposed in the space surrounded by the pair of right and left upper seat rails 21 and the pair of right and left lower seat rails 22, and the sensor may be disposed in an inner space of the main frame 10, for example.

Also, in the illustrative embodiment, the bracket 60 is bent so that the first attachment surface is perpendicular to the second attachment surface. However, the disclosure is not limited to this configuration. For example, the bracket 60 may be configured so that the first attachment surface is inclined relative to the second attachment surface. That is, the vertical plate part 62 may be obliquely inclined relative to the horizontal plate part 61 of the bracket 60.

Also, in the illustrative embodiment, the bracket 60 is provided next to the attachment position of the rear cushion unit 19 to the body frame 13. However, the disclosure is not limited thereto. For example, the bracket 60 may be provided at any position of the vehicle body frame 1 at which the strength and rigidity of the vehicle body frame 1 are sufficiently high.

Also, in the illustrative embodiment, the bracket 60 is positioned just below the seat 29. However, the disclosure is not limited thereto. For example, the bracket 60 may be provided at any position of the vehicle body frame 1 inasmuch as the operability is not largely lowered upon the turning of the vehicle body.

Also, in the illustrative embodiment, the bracket 60 is fixed to the vehicle body frame 1 via the rubber bush 63 serving as the vibration absorbing material. However, the disclosure is not limited thereto. For example, the vibration absorbing material may be any material capable of absorbing the vibrations to be propagated from the vehicle body frame 1 to the bracket 60. For instance, the vibration absorbing material may be an elastic member such as a spring or a foamed material such as a sponge.

Also, in the illustrative embodiment, the inertial sensor 80 is fixed with being spaced from the outer surface 73 of the bracket 60 via the attachment plate 74. However, the disclosure is not limited thereto. For example, the inertial sensor 80 may be fixed to the outer surface 73 of the bracket 60 via a rubber seat serving as other vibration absorbing material. In this case, the other vibration absorbing material may be an elastic member such as a spring or a foamed material such as a sponge. Also, the same vibration absorbing material as the rubber bush 63 may be used for attachment of the arm parts 82 of the inertial sensor 80.

Also, in the illustrative embodiment, the bracket 60 is supported to the upper seat rail 21 and the rail bridge 23 in the double supporting manner. However, the disclosure is not limited thereto. For example, the bracket 60 may be supported to the vehicle body frame 1 in a cantilever manner.

Also, in the illustrative embodiment, the ABS unit 30 has been exemplified as the component to be attached to the bracket 60. However, the disclosure is not limited thereto. For example, the component may be any component that can be attached to the bracket 60. For instance, an ECU (Engine Control Unit), a battery or an exhaust valve actuator may also be possible.

Also, in the illustrative embodiment, the inertial sensor 80 to be used for the ABS control has been exemplified as the sensor to be attached to the bracket 60. However, the disclosure is not limited thereto. For example, the sensor may be a sensor to be used for vehicle body control and engine control such as traction control and wheelie control, is not limited to a sensor configured to measure acceleration and the like, and may be any sensor to be used for a vehicle. That is, the sensor is a concept including not only the acceleration sensor but also a temperature sensor, a flow rate sensor, a gas sensor, a pressure sensor and the like.

As described above, the disclosure has the effect of sufficiently suppressing the vibration propagation to the sensor and is particularly useful for the sensor support structure of the motorcycle.

What is claimed is:

1. A sensor support structure, comprising:
   a bracket fixed to a vehicle body frame comprised of a plurality of frame members;
   a sensor attached to a first attachment surface of the bracket; and
   a component attached to a second attachment surface of the bracket,
   wherein
   the sensor is disposed in a space surrounded by the plurality of frame members of the vehicle body frame, and
   the first attachment surface is inclined or orthogonal relative to the second attachment surface.

2. The sensor support structure according to claim 1,
   wherein the plurality of frame members include a main frame configured to support an engine, a pair of right and left upper seat rails configured to support a seat at the rear of the main frame, and a pair of right and left lower seat rails configured to support the pair of right and left upper seat rails from below, and
   wherein the sensor is disposed in a space surrounded by the pair of right and left upper seat rails and the pair of right and left lower seat rails.

3. The sensor support structure according to claim 1, wherein the bracket is provided next to an attachment position of a rear cushion unit to the vehicle body frame.

4. The sensor support structure according to claim 1, wherein the bracket is positioned just below a seat.

5. A motorcycle comprising the sensor support structure according to claim 1.

6. A sensor support structure, comprising:
a bracket fixed to a vehicle body frame comprised of a plurality of frame members;
a sensor attached to a first attachment surface of the bracket; and
a component attached to a second attachment surface of the bracket,
wherein
the sensor is disposed in a space surrounded by the plurality of frame members of the vehicle body frame, and
an outer surface of the bracket obtained by bending one end-side of the bracket in a right and left direction of a vehicle body is the first attachment surface, and
the sensor is disposed between the frame member and the component.

7. A sensor support structure, comprising:
a bracket fixed to a vehicle body frame comprised of a plurality of frame members;
a sensor attached to a first attachment surface of the bracket;
a component attached to a second attachment surface of the bracket;
a vibration absorbing material interposed between the bracket and the vehicle body frame; and
another vibration absorbing material interposed between the sensor and the first attachment surface
wherein the sensor is disposed in a space surrounded by the plurality of frame members of the vehicle body frame.

* * * * *